United States Patent
Koch et al.

(10) Patent No.: US 10,823,919 B2
(45) Date of Patent: Nov. 3, 2020

(54) PLUG-IN CONNECTOR PART

(71) Applicant: NEUTRIK AG, Schaan (LI)

(72) Inventors: Matthias Koch, Gotzis (AT); Kevin Zechmann, Nenzing (AT)

(73) Assignee: NEUTRIK AG, Schaan (LI)

( * ) Notice: Subject to any disclaimer, the term of this patent is extended or adjusted under 35 U.S.C. 154(b) by 0 days.

(21) Appl. No.: 16/393,264

(22) Filed: Apr. 24, 2019

(65) Prior Publication Data

US 2019/0339462 A1     Nov. 7, 2019

(30) Foreign Application Priority Data

May 7, 2018   (DE) .................... 20 2018 102 532 U

(51) Int. Cl.
   *G02B 6/38*     (2006.01)
   *H01R 13/512*   (2006.01)
   *H01R 13/52*    (2006.01)

(52) U.S. Cl.
   CPC ......... *G02B 6/3893* (2013.01); *H01R 13/512* (2013.01); *H01R 13/5213* (2013.01)

(58) Field of Classification Search
   None
   See application file for complete search history.

(56) References Cited

U.S. PATENT DOCUMENTS

| | | |
|---|---|---|
| 5,957,706 A | 9/1999 | Phillips, Jr. et al. |
| 6,086,400 A | 7/2000 | Fowler |
| 9,958,617 B2 | 5/2018 | Koch |
| 2012/0009807 A1 | 1/2012 | Kuo |

FOREIGN PATENT DOCUMENTS

| | | |
|---|---|---|
| EP | 2395609 | 12/2011 |
| EP | 3196684 | 7/2017 |
| GB | 2299460 | 10/1996 |

OTHER PUBLICATIONS

OpticalCON MTP® 24 Cable, www.neutrik.com/en/audio/opticalcon/opticalcon-mtp-24-cable, 1 pg, downloaded Apr. 16, 2018.

*Primary Examiner* — Jerry Rahll
(74) *Attorney, Agent, or Firm* — Volpe Koenig

(57) ABSTRACT

A plug-in connector part for a plug-in connection, the plug-in connector part including a housing having first and second housing parts which are screw-connected together by a releasable screw connection. A fixed toothing is fixed on the first housing part and a locking ring and a preload spring are mounted on the second housing part. The locking ring is mounted on the second housing part so as to be displaceable and the preload spring preloads the locking ring in a direction toward an engagement position and the locking ring engages in the fixed toothing in the engagement position. With the locking ring in the engagement position, the screw connection is blocked in the connected state to prevent the screw connection being unscrewed. The locking ring is movable to a release position where the screw connection is rotatable in the connected state for unscrewing. The locking ring includes a gripping surface which is longitudinally extended in the longitudinal direction of the second housing part and a counter toothing with teeth which protrude from the gripping surface in the direction toward the fixed toothing.

13 Claims, 3 Drawing Sheets

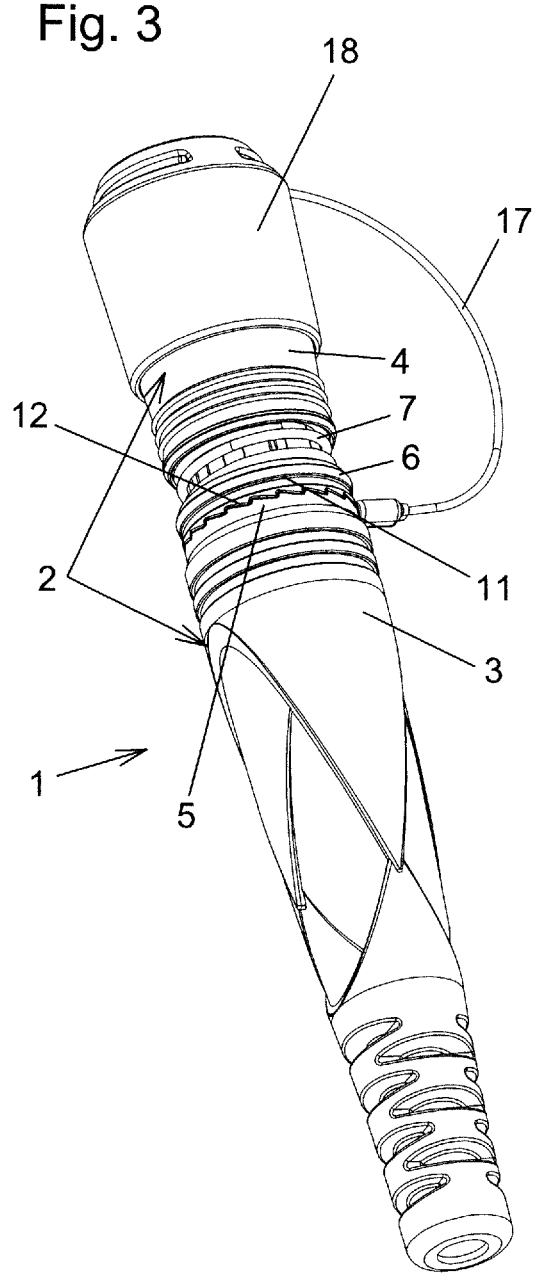
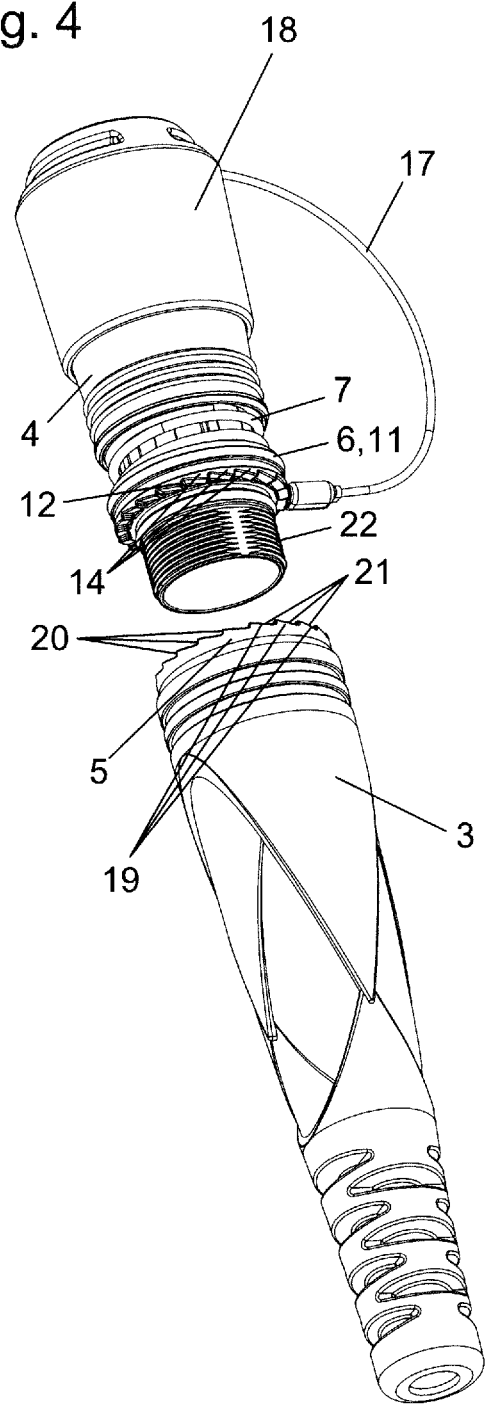

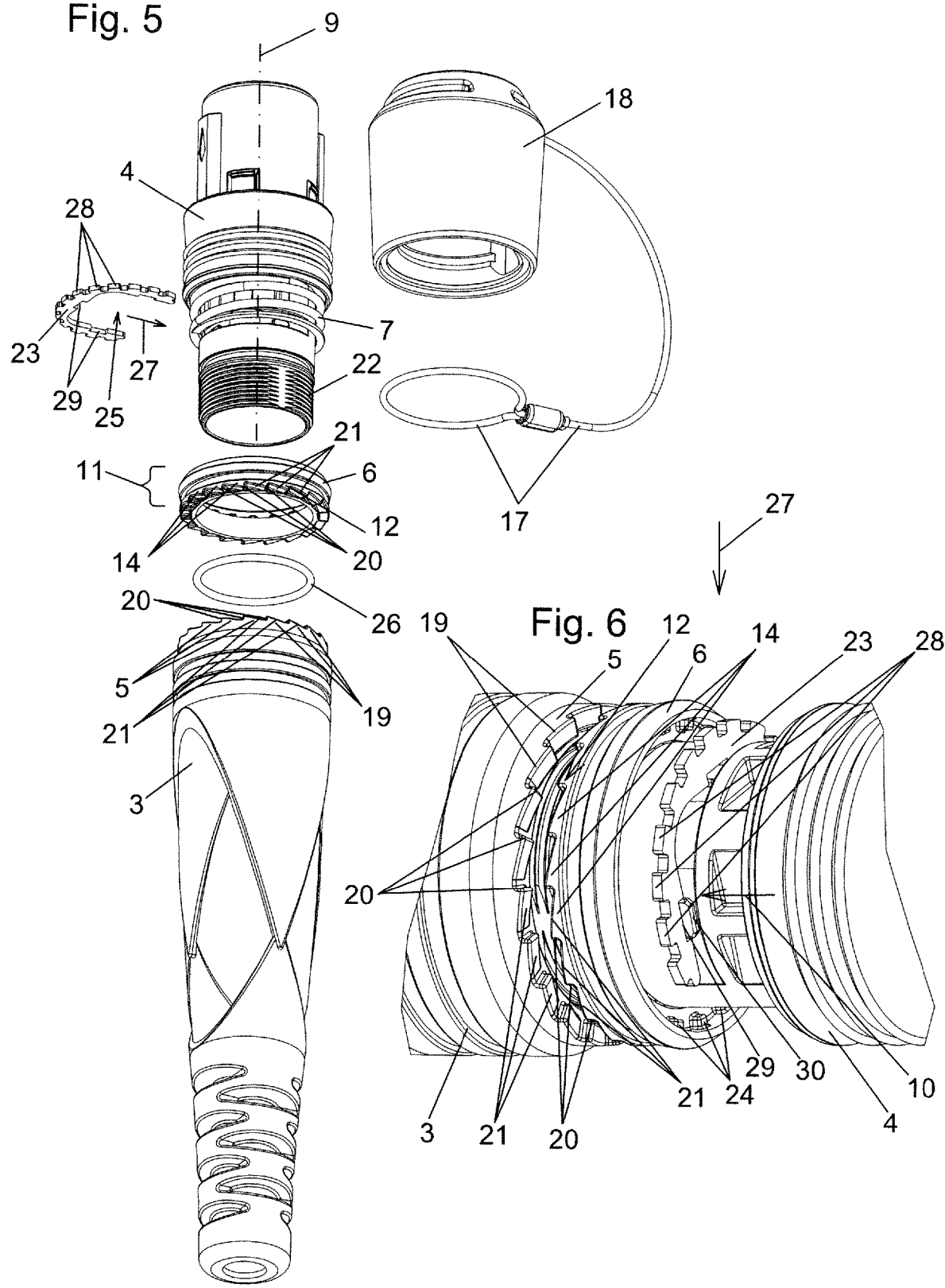

PLUG-IN CONNECTOR PART

INCORPORATION BY REFERENCE

The following documents are incorporated herein by reference as if fully set forth: German Utility Model Application No. 20 2018 102 532.5, filed May 7, 2018.

BACKGROUND

The present invention relates to a plug-in connector part for an optical and/or electrical plug-in connection, wherein the plug-in connector part comprises a housing and the housing comprises a first housing part and at least one second housing part, and the first housing part and the second housing part are screw-connected together in a connected state by a releasable screw connection and a fixed toothing is fixed on the first housing part and a locking ring of the plug-in connector part and a preload spring of the plug-in connector part are mounted on the second housing part, wherein the locking ring is mounted on the second housing part so as to be displaceable in directions parallel to a longitudinal direction of the second housing part and the preload spring preloads the locking ring in a direction toward an engagement position and the locking ring engages in the fixed toothing in the engagement position, wherein, with the locking ring in the engagement position, the screw connection is blocked in the connected state to prevent the screw connection from being unscrewed and wherein in the connected state, with the locking ring in a release position in which the locking ring is raised from the fixed toothing in opposition to the preload of the preload spring, the screw connection is rotatable for unscrewing the screw connection.

Plug-in connector parts of this type are known per se. Such plug-in connector parts for an optical plug-in connection are available in the market, for example under the trade name OpticalCon. The locking ring and its engagement in the fixed toothing are to prevent the screw connection between the first and the second housing part from being inadvertently opened. In the case of generic plug-in connector parts, it is provided, in contrast, that the locking ring has to be moved in a targeted manner into its release position before the screw connection between the two housing parts is able to be unscrewed.

A very flat metal ring which comprises recesses, in which the fixed toothing engages when the locking ring is in the engagement position, is used as locking ring in the prior art. Practice has shown that said locking rings disclosed in the prior art are difficult to operate. Fingers have even been cut on said locking rings used in the prior art.

SUMMARY

It is the object of the invention to provide an improvement here which helps to eliminate the noted problems.

For this purpose, the invention provides a plug-in part of the type named above where it is provided that the locking ring comprises a gripping surface which is longitudinally extended in the longitudinal direction of the second housing part and a counter toothing with teeth which protrude from the gripping surface in the direction toward the fixed toothing.

As a result of the gripping surface of the locking ring being longitudinally extended in the longitudinal direction of the second housing part, the locking ring can be gripped better than in the prior art in order to pull it out of the engagement position in a targeted manner against the preloading of the preload spring in order then to be able to unscrew the screw connection and to separate the two housing parts from one another. As a result of the gripping surface being longitudinally extended and consequently larger compared to the prior art, and also as a result of the fact of the design according to the invention of the counter toothing with its teeth protruding from the gripping surface in the direction toward the fixed toothing, the risk of injury when actuating the locking ring is furthermore reduced as the engagement between the fixed toothing and the counter toothing is removed further, compared to the prior art named in the introduction, from the region of the locking ring at which said locking ring is gripped. With regard to as large a gripping surface as possible which is easy to grip, preferred variants of the invention provide that the gripping surface of the locking ring comprises a longitudinal extension of a least 2 mm (millimeters), preferably of at least 3 mm, in the longitudinal direction of the second housing part. In a particularly preferred manner, said longitudinal extension is within the range of between 2 mm and 6 mm. Generally speaking, the concept of a gripping surface which is longitudinally extended means that the locking ring also has a certain dimension in the direction orthogonally to its circumferential direction such that simply a gripping surface which is easily grippable by the fingers is provided. The concept of the longitudinally extended gripping surface does not mean that the locking ring has to have its largest dimension in said direction.

In principle, the locking ring according to the invention can be realized from different materials. Metal parts, cast parts, in particular metal die cast parts, and the like are possible. In a particularly preferred manner, however, the locking ring is a plastics material part. The locking ring is preferably realized in one piece. As a plastics material part, it is able to be produced, for example, using injection molding in a cost-efficient manner in large quantities. In a particularly preferred manner, the locking ring is an injection-molded part which can be produced from plastics material.

Plug-in connector parts according to the invention can be utilized both to transmit optical signals and to transmit electric signals and to transmit electric power via a plug-in connection. Hybrid plug-in connector parts, which have both optical and electrical contacts, are also possible according to the invention. A corresponding plug-in connection comprises, as a rule, two plug-in connector parts which can be plugged together in order thus to connect, for example, two cables or one cable to a device. The optical and/or electrical contacts of such plug-in connections or their plug-in connector parts according to the invention can be realized as known per se in the prior art such that this no longer has to be described here.

Due to unambiguous linguistic assignment, the toothing fixed on the first housing part is consistently designated here as a fixed toothing. It can be molded in one piece on the first housing part but can also be produced in another manner first of all as a separate component and then fastened or fixed on the first housing part. The concept of fixing, in this connection, means that said fixed toothing cannot move relative to the first housing part.

The toothing of the locking ring is consistently designated as counter toothing in order to enable clear linguistic differentiation here. The preload spring is generally speaking an elastic element which applies a preload to the locking ring in the direction toward the engagement position. The preload spring can be a helical spring, a leaf spring assembly or the like or, for example, can also be realized as an elastomer body etc. The longitudinal direction of the second housing part is the direction of the longitudinal extension of the second housing part. In the state connected together, said longitudinal direction also corresponds, as a rule, to the longitudinal direction of the first housing part or of the entire housing of the plug-in connector part according to the invention. The concept of unscrewing the screw connection describes the screwing operation which has to be carried out in order to open the screw connection, that is to say to separate the two housing parts from one another. The concept of tightening the screw connection describes the screwing operation in the opposite direction to this which has to be carried out in order to close the screw connection, that is to say in order to connect the two housing parts together.

In preferred design forms, at least one recess is realized in the gripping surface of the locking ring. The indentation could also be called a molding or a channel. The advantage of the indentation for one thing can be that, as a result, the locking ring can be easier to grip and actuate. Particularly preferred variants provide that the indentation is realized as a circumferential groove in the locking ring. It can also be provided in this connection that a fastening cord of a closure cap of the plug-in connector part is arranged in the indentation which is realized as the circumferential groove. In such design forms, the indentation then not only serves therefore to improve the tangibility of the locking ring but also serves as means for fastening the closure cap of the plug-in connector part. The fastening cord fastened in this way then protects the closure cap against loss. The concept of the cord is to be understood in a general manner in this context, it can also be a cable, wire, wire rope or another flexible object which can be stretched longitudinally in any other manner such as a chain or the like.

Preferred variants of the invention provide that the fixed toothing on the first housing part is realized as a sequence of teeth which are arranged consecutively in a ring-shaped manner and which in each case are directly connected to one another. In other words, the fixed toothing on the first housing part is therefore realized in a preferred manner such that one tooth connects directly to the next one or follows the next tooth and the teeth arranged in this manner realize one common ring structure which is preferably closed per se. As a result, a very fine grid can be created such that locking occurs again rapidly even at relatively small angles of rotation. It is also provided in an expedient manner that the teeth of the counter toothing of the locking ring are realized as a sequence of teeth which are arranged consecutively in a ring-shaped manner and which in each case are directly connected together. In order, on the one hand, not to have to hold the locking ring specifically in the release position when tightening the screw connection, but on the other hand also preventing unwanted unscrewing of the screw connection, preferred variants provide that the teeth of the fixed toothing on the first housing part and the teeth of the counter toothing of the locking ring comprise in each case a steep tooth flank and in each case a flat tooth flank and, with the locking ring in the engagement position, the interaction between the steep tooth flanks of the teeth of the fixed toothing and the steep tooth flanks of the teeth of the counter toothing of the locking ring blocks the screw connection being unscrewed and, with the locking ring in the engagement position, the flat tooth flanks of the teeth of the fixed toothing and the flat tooth flanks of the teeth of the counter toothing of the locking ring allow the screw connection to be tightened by sliding past one another. A steep tooth flank extends, in this case, expediently parallel or at a small acute angle of, for example, no more than 10°, preferably no more than 5°, relative to the longitudinal direction of the second housing part, when viewed in the connected state. The flat tooth flanks comprise, when viewed in said connected state, expediently a relatively large acute angle relative to the longitudinal direction of the second housing part of, for example, at least 70°, preferably at least 75°. In order to create an anti-rotation device for the locking ring on the second housing part, it is expediently provided that the second housing part comprises at least one positive locking element and the locking ring comprises at least one counter positive locking element and the locking ring is secured on the second housing part against rotation of the locking ring in its circumferential direction by the engagement of the counter positive locking element in the positive locking element. The positive locking element, in this case, can be directly incorporated into the second housing part. With regard to a simple assembly of the locking ring and of the preload spring on the second housing part, preferred design forms, however, provide that the positive locking element is an attachment part which is fastenable in a non-rotatable manner on the second housing part. This means that the positive locking element is first of all produced as a separate attachment part and is then fastened in a non-rotatable manner to the second housing part at a corresponding point in the assembly operation. The counter positive locking element, in contrast, is molded in a preferred manner directly into the locking ring. The counter positive locking element can be molded, in particular, on the inside of the locking ring which points to the second housing part in the mounted state. The positive locking element and the counter positive locking element can interact with one another by one single positive locking closure but also by a plurality of positive locking closures. Particularly preferred variants provide that the positive locking element comprises a receiving opening, which is open on one side, for fitting the positive locking element onto the second housing part. When fitting the positive locking element onto the second housing part, in the case of such design forms the second housing part can be inserted into the receiving opening. The positive locking element can comprise an external toothing for the positive locking closure with the counter positive locking closure element of the locking ring and an internal toothing for the captive fastening on the second housing part. The second housing part can provide one or multiple positive locking closure ribs for interaction with the internal toothing of the positive locking element.

BRIEF DESCRIPTION OF THE DRAWINGS

Further features and details of preferred variants of the invention are explained as an example by way of an exemplary embodiment according to the invention in the following description of the figures, in which:

FIG. 3 shows a perspective view of the plug-in connector part according to the invention;

FIG. 4 shows the first housing part and the second housing part of the plug-in connector part according to the invention according to FIG. 1 in the state separated from one another, unscrewed;

FIG. 5 shows an exploded representation of a few components, essential here for better understanding, of the plug-in connector part according to the invention according to FIG. 1 and FIG. 6 shows a representation of a detail of the fastening of the positive locking element on the second housing part for better understanding, the preload spring not being shown in FIG. 6.

DETAILED DESCRIPTION

The plug-in connector part 1 according to the invention in said example shown here is part of an optical plug-in connection which can be used for connecting optically conducting cables to other optically conducting cables or for the connection to the housing of devices. The respective counter plug-in connector parts for completing the plug-in connections are not shown here. They can be realized as in the prior art, for example, in the case of the plug-connector series OpticalCon noted in the introduction and do not have to be explained further here.

Figure 1:
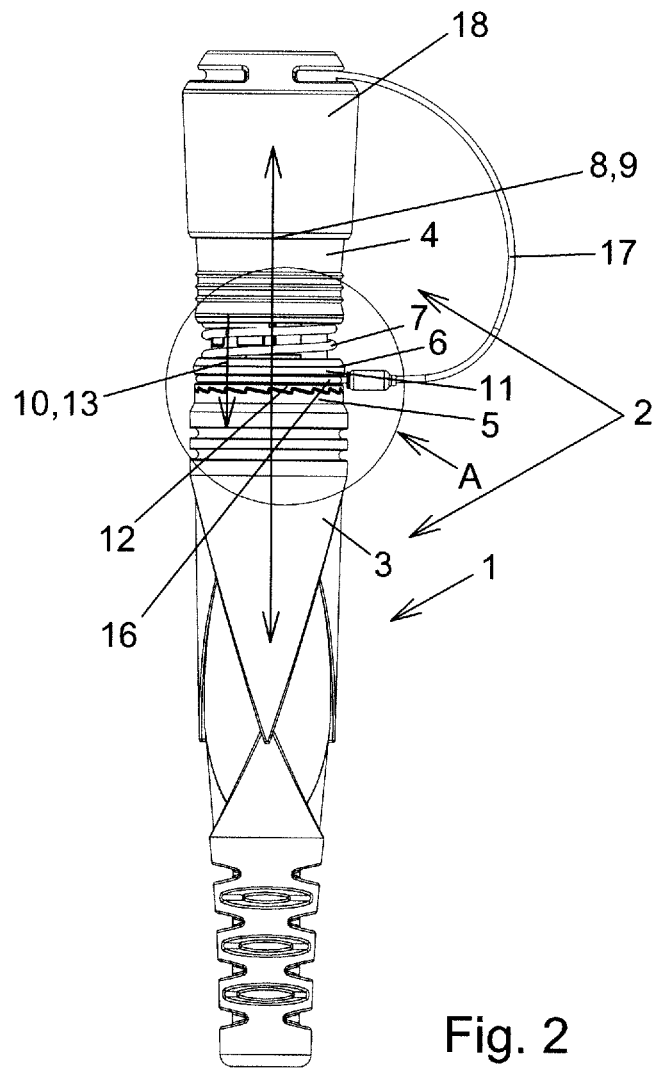
FIG. 1 shows an outside view of a plug-in connector part according to the invention.

The housing 2 of the plug-in connector part 1 consists in any case of the first housing part 3 and the second housing part 4 which are screw-connected together by a screw connection. FIG. 1 shows the connected state in which the two housing parts 3 and 4 are screw-connected together. FIG. 4 shows the disconnected state. The external thread 22 of the second housing part 4 is easy to see here. The corresponding internal thread, forming the screw connection together with the external thread 22, on the first housing part 3 cannot be seen but is realized corresponding to the prior art. The fixed toothing 5 is fixed on the first housing part 3. This means that the fixed toothing 5 cannot be moved relative to the first housing part 3. The fixed toothing 5 can be realized or molded directly on the first housing part 3 or can be produced first of all as an attachment part and then fixed correspondingly on the first housing part 3. The locking ring 6 and the preload spring 7 are arranged on the second housing part 4. The locking ring 6 is mounted on said second housing part 4 so as to be displaceable in directions 8 parallel to the longitudinal direction 9 of the second housing part 4. The preload spring 7 preloads the locking ring 6 in the direction 10 toward an engagement position. In the engagement position shown here in FIG. 1, the locking ring 6 engages in the fixed toothing 5. As a result, in the connected state when the locking ring 6 is situated in the engagement position, unscrewing of the screw connection between the two housing parts 3 and 4 is blocked. In order to be able to unscrew the housing parts 3 and 4, the locking ring 6 has to be raised from the fixed toothing 5 in opposition to the preloading of the preload spring 7 in the opposite direction to the direction 10, only then, and with the locking ring 6 correspondingly retained in the release position, is it possible to unscrew the screw connection between the housing parts 3 and 4. In this case, the fixed toothing 5 of the first housing part 3 and the counter toothing 12 on the locking ring 6 are no longer in engagement in said release state.

According to the invention, the locking ring 6 comprises a gripping surface 11 which is longitudinally extended in the longitudinal direction 9 of the second housing part 4. The counter toothing 12 of the locking ring 6 comprises teeth 14 which protrude from the gripping surface 11 in the direction 13 toward the fixed toothing 5. The advantages of said design features according to the invention compared to the prior art have been explained in the introduction.

The longitudinal extension 15 of the gripping surface 11 of the locking ring 6 in the longitudinal direction 9 of the second housing part 4 is expediently at least 2 mm, preferably at least 3 mm. In a particularly preferred manner, the locking ring 6 is realized as a plastics material part, in particular as an injection-molded part. However, other materials such as, for example, metal or the like are naturally also conceivable.

Figure 2:
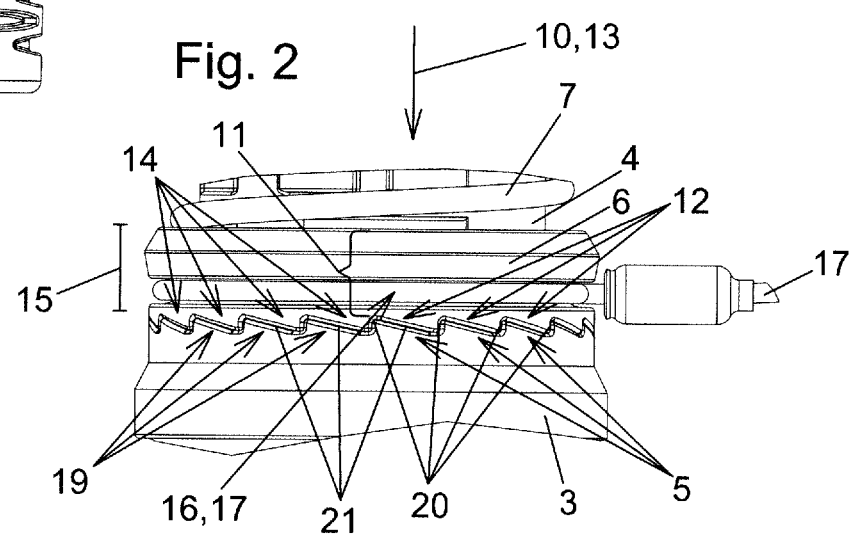
FIG. 2 shows the region A from FIG. 1 in an enlarged manner.

FIG. 2 shows the region A from FIG. 1 in an enlarged manner. It is particularly easy to see here that the fixed toothing 5 on the first housing part 3 comprises a sequence of teeth 19 which are arranged consecutively in a ring-shaped manner and which in each case are directly connected together. In an analogous manner, the teeth 14 of the counter toothing 12 of the locking ring 6 also form a sequence of teeth 14 which are arranged consecutively in a ring-shaped manner and which in each case are directly connected together. Both the teeth 14 of the counter toothing 12 of the locking ring 6 and the teeth 19 of the fixed toothing 5 of the first housing part 3 comprise in each case steep tooth flanks 20 and flat tooth flanks 21. The interaction between the steep tooth flanks 20 between the teeth 14 of the locking ring 6 and the teeth 19 of the first housing part 3 in the engagement position, shown in FIGS. 1 and 2, blocks the unscrewing of the screw connection. The flat tooth flanks 21 of the teeth 19 of the fixed toothing 5 and the flat tooth flanks 21 of the teeth 14 of the counter toothing 12 of the locking ring 6 make it possible, in contrast, for them to slide past one another and consequently for the screw connection to be tightened without the locking ring 6 having to be pulled into the release position for this purpose in opposition to the preloading of the preload spring 7 and in the opposite direction to the direction 10 and 13. This design form of the toothing consequently makes it possible to tighten the screw connection between the housing parts 3 and 4 in the engagement position without having to pull separately on the locking ring 6 for this purpose, whereas unscrewing of the screw connection is only possible when the locking ring is pulled in the opposite direction to the direction 10 and 13, and consequently in opposition to the preloading of the preload spring 7, out of the engagement position according to FIGS. 1 and 2 into the release position in which the counter toothing 12 of the locking ring 6 no longer engages in the fixed toothing 5 on the first housing part 3.

An indentation 16, which is realized here in said exemplary embodiment as a circumferential groove, is situated in the gripping surface 11 of the locking ring 6. The locking ring 6 is able to be gripped particularly well on its gripping surface 11 as a result of said indentation 16. As already explained in the introduction, the circumferential groove can also be used, however, as part of a loss prevention device for the closure cap 18 of the plug-in connector part 1 by the fastening cord 17 fastened on the closure cap 18 being arranged in the indentation 16 realized as a circumferential groove or being fastened therein. This can also be seen particularly well in FIG. 2.

FIGS. 3 and 4 show the features already explained again, in each case from a different perspective.

In the exploded representation according to FIG. 5, the two housing parts 3 and 4 have been unscrewed. The locking ring 6 and also the positive locking element 23, explained again below, as well as the closure cap 18, are shown removed from the second housing part 4. In addition, it is possible to see another sealing ring 26 which is known per se and seals the screw connection between the external thread 22 and the corresponding internal thread (not visible here) in the first housing part 3 when the two housing parts 3 and 4 are screwed together in a corresponding manner, that is to say are in the connected state.

The positive locking element 23 is realized here as an attachment part which is fastenable in a non-rotatable manner on the second housing part 4. It serves as an anti-rotation device for the locking ring 6 so that it is not able to rotate about the longitudinal direction 9 thereof relative to the second housing part 4. To this end, the locking ring 6 comprises a counter positive locking element 24 which, in this exemplary embodiment, lies inside, that is to say in the direction toward the second housing part 4. In the exemplary embodiment shown, this is embodied by the counter positive locking elements 24 which can be seen in FIG. 6, lie on the inside, are realized as a sequence of teeth and, in this exemplary embodiment, are molded integrally on the locking ring 6. The positive locking element 23 comprises a receiving opening 25 which is open on one side, by way of which it can be fitted onto the second housing part 4 in the direction 27 shown in FIG. 5 orthogonally to the longitudinal direction 9 of the second housing part 4. The positive locking element 23 shown comprises a sequence of external toothing 28 which serve for positive locking engagement in the counter positive locking elements 24 on the locking ring 6. The internal toothing 29 on the positive locking element 23 shown here serves, in contrast, together with the form of the receiving opening 25 and the correspondingly corresponding form on the second housing part 4 for fastening the positive locking element 23 in an anti-rotational manner on the second housing part 4. To this end, the positive locking element 23 is first of all slid in the sliding direction 27 out of the position shown in FIG. 5 onto the second housing part 4 in such a manner that the second housing part 4 comes to rest in the receiving opening 25 of the positive locking element 23. The positive locking element 23 is then slid in the direction 10 shown in FIG. 6 onto the positive locking ribs 30 of the second housing part 4 so that the positive locking ribs 30 come to rest in the internal toothing 29 of the positive locking element 23. The result is rotation-proof fastening of the positive locking element 23 on the second housing part 4 and consequently, via the engagement of the positive locking element 23 in the counter positive locking elements 24 on the locking ring 6, rotation-proof securement of the locking ring 6 on the second housing part 4. In spite of said rotation-proof securement, the locking ring 6 is mounted on the second housing part 4 so as still to be displaceable in the directions 10 and 13 and in the corresponding counter directions, the preload spring 7, as already explained in the introduction, simply preloading the locking ring 6 in directions 10 or 13 towards the fixed toothing 5 of the first housing part 3 when the two housing parts 3 and 4 are correspondingly situated in the connected state by the screw connection.

The preload spring 7 is not shown in FIG. 6 so that the positive locking element 23 on the second housing part 4 is easier to see.

KEY TO THE REFERENCE SYMBOLS

1 Plug-in connector part
2 Housing
3 First housing part
4 Second housing part
5 Fixed toothing
6 Locking ring
7 Preload spring
8 Direction
9 Longitudinal direction
10 Direction
11 Gripping surface
12 Counter toothing
13 Direction
14 Tooth
15 Longitudinal extension
16 Indentation
17 Fastening cord
18 Closure cap
19 Tooth
20 Steep tooth flank
21 Flat tooth flank
22 External thread
23 Positive locking element
24 Counter positive locking element
25 Receiving opening
26 Sealing ring
27 Sliding direction
28 External toothing
29 Internal toothing
30 Positive locking rib

The invention claimed is:

1. A plug-in connector part for at least one of an optical or electrical plug-in connection, the plug-in connector part comprises:
 a housing including a first housing part and a second housing part, the first housing part and the second housing part are screw-connected together in a connected state by a releasable screw connection;
 a fixed toothing fixed on the first housing part;
 a locking ring mounted on the second housing part so as to be displaceable in directions parallel to a longitudinal direction of the second housing part;
 a preload spring mounted on the second housing part that preloads the locking ring in a direction toward an engagement position;
 the locking ring engages in the fixed toothing in the engagement position, and, with the locking ring in the engagement position, the releasable screw connection is blocked in the connected state to prevent the releasable screw connection from being unscrewed, and in the connected state, with the locking ring in a release position in which the locking ring is raised from the fixed toothing in opposition to the preload of the preload spring, the releasable screw connection is rotatable for unscrewing the releasable screw connection; and
 the locking ring comprises a gripping surface which extends longitudinally in the longitudinal direction of the second housing part, and a counter toothing with teeth which protrude from the gripping surface in a direction toward the fixed toothing.

2. The plug-in connector part as claimed in claim 1, wherein the gripping surface of the locking ring comprises a longitudinal extension of a least 2 mm in the longitudinal direction of the second housing part.

3. The plug-in connector part as claimed in claim 1, wherein the locking ring (6) is a plastics material part.

4. The plug-in connector part as claimed in claim 1, further comprising at least one indentation in the gripping surface of the locking ring.

5. The plug-in connector part as claimed in claim 4, wherein the indentation comprises a circumferential groove in the locking ring.

6. The plug-in connector part as claimed in claim 5, further comprising a fastening cord for a closure cap of the plug-in connector part arranged in the indentation formed as the circumferential groove.

7. The plug-in connector part as claimed in claim 1, wherein the fixed toothing on the first housing part comprises a sequence of teeth which are arranged consecutively in a ring-shaped arrangement and which in each case directly follow one another.

8. The plug-in connector part as claimed in claim 1, wherein the teeth of the counter toothing of the locking ring comprise a sequence of teeth which are arranged consecutively in a ring-shaped arrangement and which in each case directly follow one another.

9. The plug-in connector part as claimed in claim 1, wherein teeth of the fixed toothing of the first housing part and the teeth of the counter toothing of the locking ring comprise in each case a steep tooth flank and in each case a flat tooth flank and, with the locking ring in the engagement position, interaction between the steep tooth flanks of the teeth of the fixed toothing and the steep tooth flanks of the teeth of the counter toothing of the locking ring blocks the screw connection being unscrewed and, with the locking ring in the engagement position, the flat tooth flanks of the teeth of the fixed toothing and the flat tooth flanks of the teeth of the counter toothing of the locking ring allow the screw connection to be tightened by sliding past one another.

10. The plug-in connector part as claimed in claim 1, wherein the second housing part comprises at least one positive locking element and the locking ring comprises at least one counter positive locking element and the locking ring is secured on the second housing part against rotation of the locking ring in a circumferential direction by engagement of the counter positive locking element in the positive locking element.

11. The plug-in connector part as claimed in claim 10, wherein the positive locking element is an attachment part which is fastenable in a non-rotatable manner on the second housing part.

12. The plug-in connector part as claimed in claim 10, wherein the counter positive locking element is molded directly into the locking ring.

13. The plug-in connector part as claimed in claim 10, wherein the positive locking element comprises a receiving opening, which is open on one side, for fitting the positive locking element onto the second housing part.

* * * * *